United States Patent Office 3,026,861
Patented Mar. 27, 1962

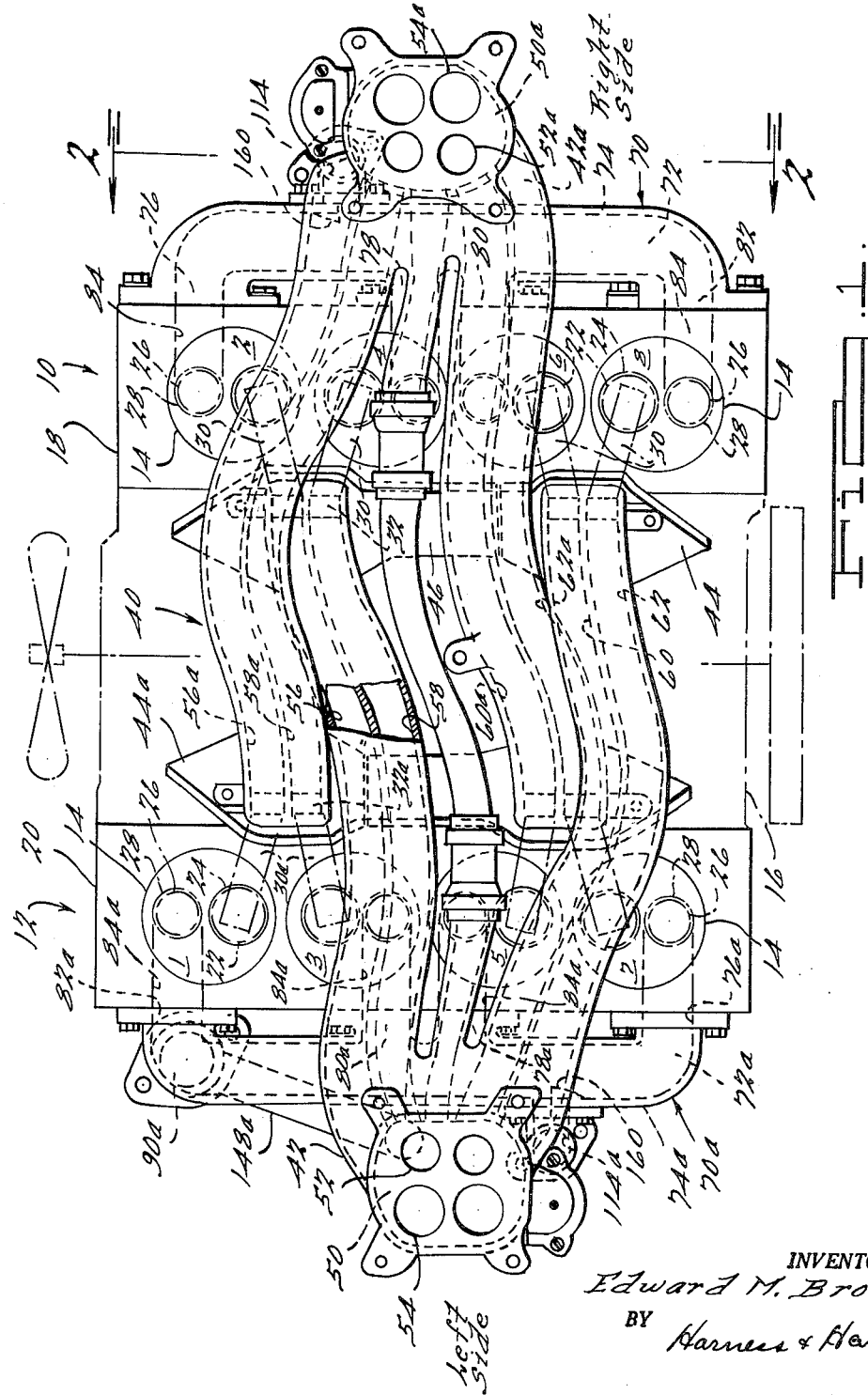

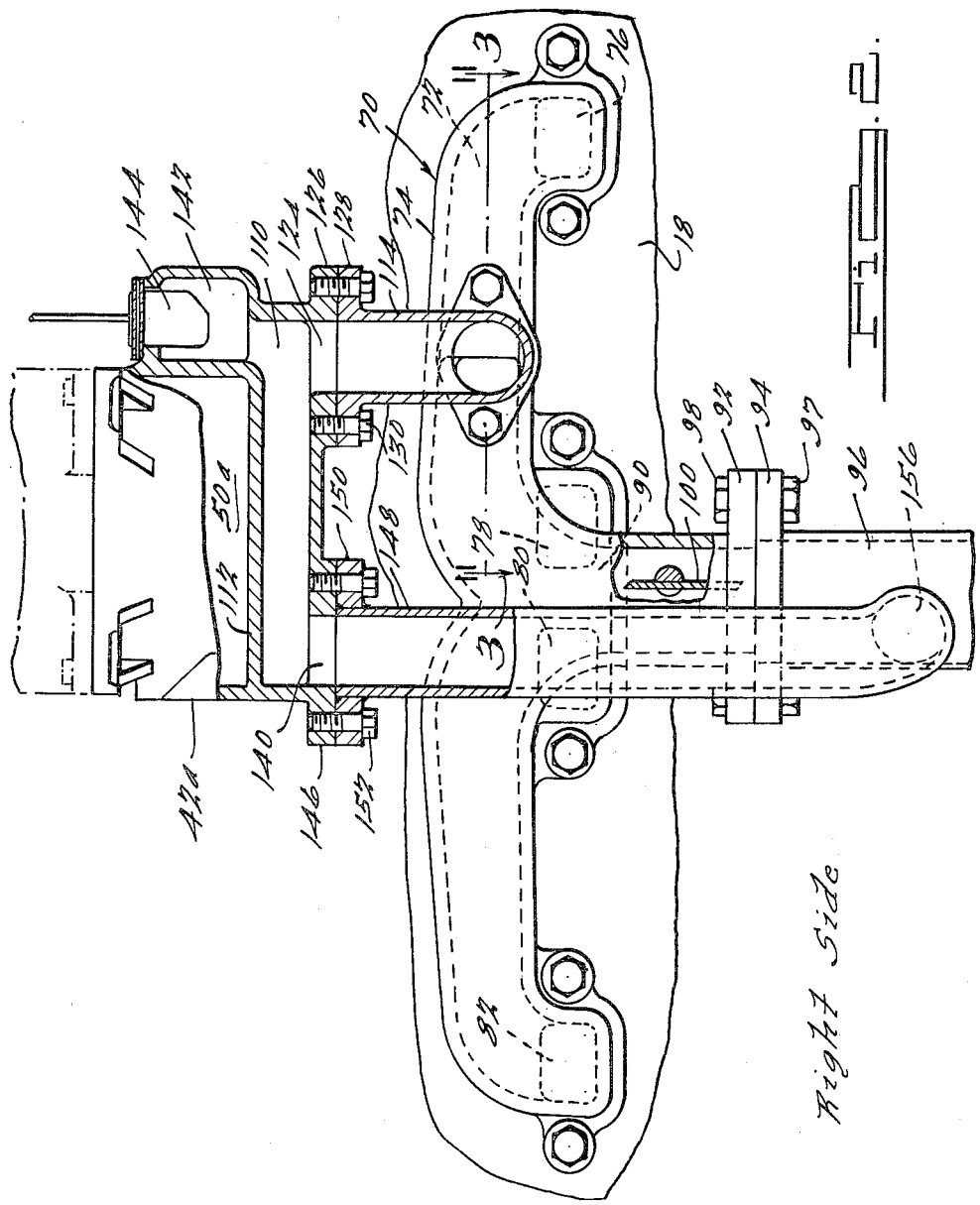

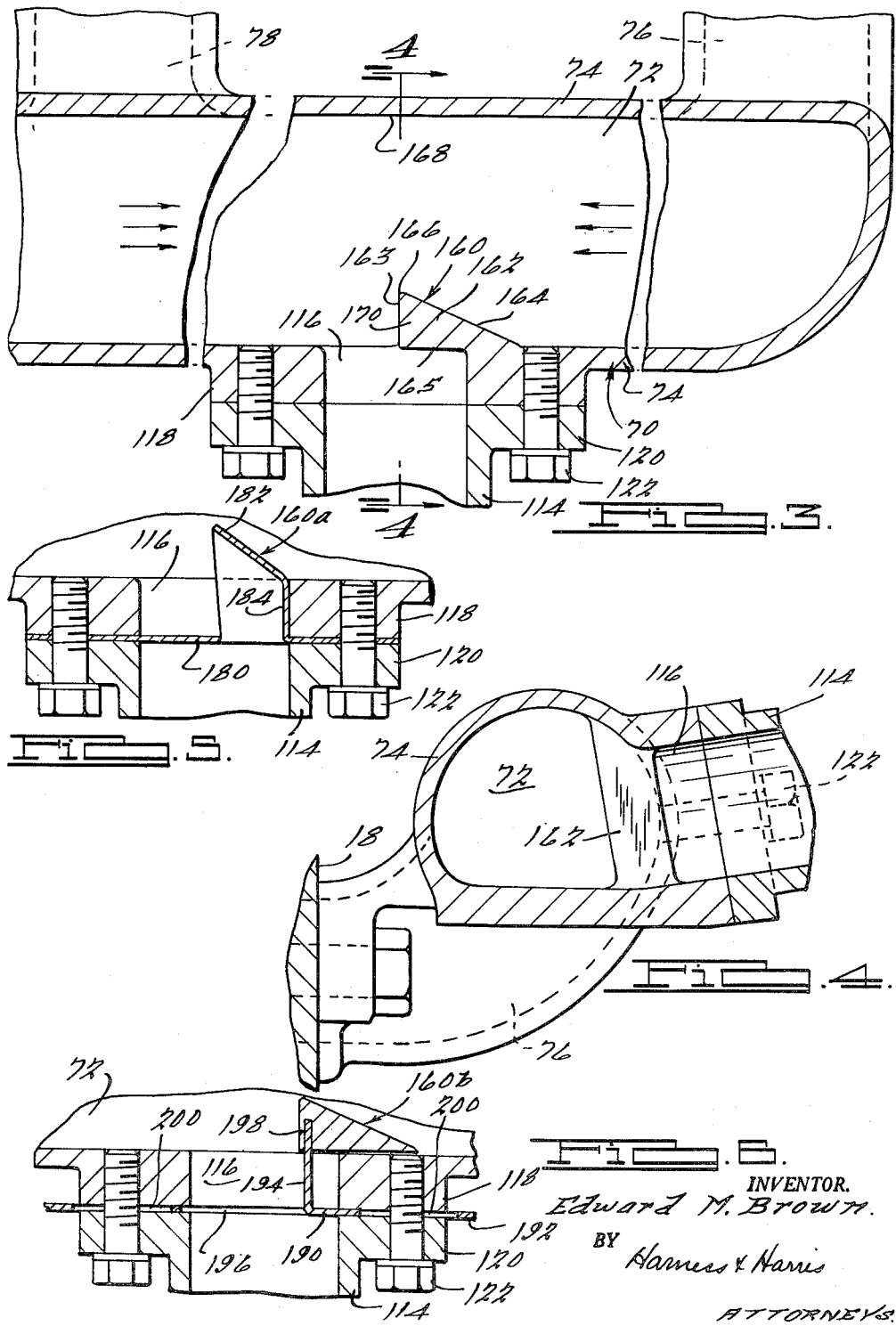

3,026,861
EXHAUST GAS HEATING SYSTEM FOR INTAKE MANIFOLD HOT SPOT AND CONTROL THEREFOR
Edward M. Brown, Royal Oak, Mich., assignor to Chrysler Corporation, Highland Park, Mich., a corporation of Delaware
Filed Aug. 18, 1960, Ser. No. 50,369
10 Claims. (Cl. 123—122)

This invention relates to engine intake systems provided with exhaust gas heated heat exchange means for warming the charge to be delivered to the cylinders of the engine, and especially to means in the exhaust manifold for controlling flow of exhaust gases to the heat exchange means for inhibiting excessive heating of the charge during high speed operation of the engine but permitting proper heating of the charge during warmup of the engine.

My invention will for purposes of illustration only, be described in connection with a V-engine of current manufacture, for example, an engine such as shown in the copending application of John B. Platner et al. Serial No. 31,930, it being understood that the invention is not limited for use in a V-engine but may be applied to any engine, including in-line engines, where exhaust gas heating of the intake hot spot is to be employed.

In V-engines such as referred to above, separate intake manifolds feed the respective cylinder banks of the engine. Each is usually provided with a carburetor-fed plenum chamber that distributes the air-fuel charge to the engine cylinders of the bank it is to feed through individual elongated conduits interconnecting the plenum chamber with the intake passages of the cylinders of such bank. The plenum chamber is provided with an exhaust gas fed hot spot or heating compartment which is in heat exchange relationship with one or more walls of the plenum chamber, preferably the floor of the plenum chamber which is usually the roof of the heating compartment. The hot exhaust gases entering the heating compartment give up a portion of their heat to these walls, which transmit the heat to the air-fuel charge passing through the plenum chamber. The engine is also provided adjacent each bank of cylinders with an elongated exhaust gas manifold having a series of exhaust gas inlets connecting with the exhaust valves and ports of the cylinders of that bank and through which inlets exhaust gas is brought to the exhaust manifold from which it is discharged through a conventional discharge outlet and conduit for delivery to the usual vehicle muffler.

Located in the exhaust discharge conduit is a thermostatically controlled heat valve which is operable between fully open and fully closed positions in response to engine temperature conditions. External supply piping or conduits are provided that connect the exhaust manifolds with the inlets of the intake manifold hot spots so as to supply the hot spots with exhaust gases for heating the charge. In addition, bypass pipes are provided externally of the engine between the hot spots and the discharge conduits of the exhaust manifolds at points outwardly beyond the heat valves for conducting the spent exhaust gases from the hot spots to the exhaust pipes and thence to the muffler or mufflers where dual mufflers are used.

During warm-up it is customary for the heat valve to be conditioned in closed position by its thermostatic control, this creating a pressure differential between the exhaust manifold and the hot spot. Under this condition the exhaust gases entering the exhaust manifold moves through the supply conduit to the hot spot and out the bypass pipe to the muffler. When the engine is up to temperature, such that less or no heating of the charge is essential, the heat valve moves to the necessary open position which may be its wide open position. The exhaust pipe then provides a free flow path for the exhaust gases entering the exhaust manifold and such gases then pass out the exhaust pipe to the muffler bypassing the smaller supply conduit interconnecting the exhaust manifold with the hot spot.

In the operation of engines such as these, it has been found that even though the heat valve is wide open, a substantial quantity of exhaust gases pass to the hot spot from the exhaust manifold at high engine speeds especially when accelerating. It is believed that the fluid pressure in the exhaust manifold builds up at the higher engine speeds due to the natural restriction at the exhaust manifold discharge outlet as amplified by the heat valve structure to create a pressure differential between the exhaust manifold and exhaust pipe facilitating a flow of exhaust from the exhaust manifold to the hot spot through the supply pipe. At the higher engine speeds the velocity flow of the exhaust gases out the exhaust pipe also increases to produce a suction or extractor effect at the bypass conduit connection with the exhaust pipe causing additional flow of some of the exhaust gas between the exhaust manifold and the hot spot through the supply conduit extending from the exhaust manifold to the hot spot. These conditions are found to produce too much heating at the hot spot. Overheating of the air-fuel charge and power losses in operation of the engine then result.

Such natural flow of exhaust gas that occurs at low speeds of the engine is not usually objectionable for then the heat valve is either partially or fully closed and some warm-up is desired at the hot spot.

It has been discovered that the natural flow of the exhaust gases at high engine speeds to the intake hot spot may be controlled to substantially inhibit power losses in the engine, by providing a suitable restriction in the elongated passage of the exhaust manifold at a position therein preferably between the connection of the supply conduit with the exhaust manifold and one of the exhaust manifold inlets. In such an arrangement the exhaust gases from at least one of the cylinders have their velocity increased by the restriction and oppose the natural movement of the exhaust gases from the remaining cylinders to the supply pipe feeding the intake hot spot.

By preference, the connection of the supply pipe for the hot spot with the exhaust manifold is made between a pair of end cylinders such that the exhaust gases delivered to the exhaust manifold from the endmost cylinder is affected by the restriction and oppose the movement of the exhaust gases delivered to the exhaust manifold by the remaining cylinders in the engine bank being three cylinders in the case of a V–8 engine. The restriction is also preferably in the form of a wedge-like lip extending over the edge of the opening in the exhaust manifold passage wall connecting with the supply pipe such that a low pressure area or aspirator effect is created at the edge of the lip by the high velocity exhaust gases moving uphill across the wedge from the end cylinder to oppose the natural flow of the exhaust gases from the other cylinders into the supply pipe caused by the aspirator and pressure differential effect at the bypass pipe connection with the exhaust pipe described above and thereby facilitate movement of substantially all the exhaust gases directly out of the exhaust pipe of the exhaust manifold. A further theory is that molecules of high velocity gas moving across the restriction create a low pressure area downstream of the lip of the restriction in the supply conduit thereby drawing gas from the supply conduit and slowing down or completely arresting movement of exhaust gases through the supply conduit to the hot spot but without hampering direct movement of the exhaust gases out the exhaust pipe of the exhaust manifold, it being remembered that at this time the heat valve is wide open.

Still another way of explaining the theory of operation is that the restriction and lip adjacent the opening of the supply pipe with the exhaust manifold creates a reverse extractor effect when the gases from the end cylinder move at high velocity across the restriction to the adjacent portions of the exhaust manifold and thereby counter or neutralize the extractor effect produced at the exhaust pipe connection of the bypass pipe with the exhaust pipe.

Accordingly it is the principal object of the invention to provide means for inhibiting the flow of exhaust gases from the exhaust manifold to the intake hot spot during high speed operation of the engine, especially when accelerating, whereby to minimize overheating of the charge and power losses by the engine.

Another object is to provide a restriction in the exhaust manifold passage of the engine adjacent the supply conduit through which exhaust gas is delivered to the intake hot spot whereby the exhaust gases of at least one cylinder of the engine will be caused to oppose movement of the exhaust gases from the other cylinders of the engine out this supply pipe during high speed operation of the engine and when the heat valve at the discharge outlet of the exhaust manifold is wide open.

A further object is to provide an inclined plane type of restriction in the longitudinal passage of the exhaust manifold of an engine adapted to cause an increase in the velocity of the exhaust gases moving in said passage over said restriction from one of the inlets of the exhaust manifold.

A specific object is to provide a restriction as set forth in the preceding object wherein this restriction is positioned over the inlet end of the supply pipe connecting the exhaust manifold with the intake hot spot for providing an extractor effect tending to oppose movement of exhaust gases into the supply pipe.

Still another object is to provide a restriction as in the preceding objects which is adjustable lengthwise of the exhaust manifold passage to adjust gas flow to the hot spot when the heat valve is not wide open and to a lesser extent control the extractor effect obtained in the supply pipe when the heat valve is wide open.

Other objects and advantages of the invention will appear from the following description and from the drawings wherein:

FIGURE 1 is a plan view of a ram-type V-8 engine such as shown in the copending application of Platner et al. aforesaid illustrating the invention as applied to each bank of the engine for controlling the flow of exhaust gases to an outboard hot spot of the intake manifold section feeding each bank of cylinders;

FIGURE 2 is a side elevation partially in section of the right bank of the engine in FIGURE 1 showing the external conduits associated with the exhaust manifold of that bank of the engine and the intake hot spot of the intake manifold feeding the opposite bank of cylinders;

FIGURE 3 is an enlarged sectional view taken at 3—3 of FIGURE 2 showing one form of restriction for carrying out the invention located in the exhaust manifold passage and its relationship to the exhaust manifold inlets and hot spot supply conduit;

FIGURE 4 is a sectional elevational view taken at 4—4 of FIGURE 3;

FIGURE 5 is an enlarged sectional view taken similarly to that in FIGURE 3 showing a separable form of exhaust manifold restriction means mounted between the exhaust manifold passage wall and the supply pipe flange and projecting into the exhaust manifold passage way; and FIGURE 6 is an enlarged elevational view taken similar to that of FIGURES 3 and 5 showing the invention as applied to an adjustable form of restriction means.

Referring now to the drawings wherein similar numerals are used to designate similar parts of the structure, the invention will be described for purposes of illustration only and not restriction to a V-8 engine such as referred to above and comprising, as seen in FIGURE 1, right and left banks 10 and 12 of cylinders 14 arranged in a block 16 to which block cylinder heads 18 and 20 are secured. Although not shown, the cylinder banks 10 and 12 are generally arranged at an angle to each other, that illustrated being in an angle of about 90° to each other.

For convenience of reference, the cylinders of the left hand bank which is to the left in FIGURE 1, looking forwardly from the flywheel end of the engine, are numbered 1, 3, 5, and 7 starting such numbering at the opposite or fan end of the engine and those of the right hand bank are numbered 2, 4, 6, and 8 respectively, these numbers appearing internally of the cylinder representations in FIGURE 1. A typical firing order for the cylinders of this engine is 1-8-4-3-6-5-7-2.

The combustion chambers (not shown) overlying the cylinders 14 in the heads 18 and 20 are each provided with a single inlet opening or port 22 closed by an inlet valve 24 and with a single smaller exhaust outlet or port 26 closed by an exhaust valve 28, these ports and valves, as seen in FIGURE 1, being preferably arranged in line longitudinally of the engine with the inlet ports of cylinders 1 and 3, 5 and 7, 2 and 4, and 6 and 8 in juxtaposition.

The inlet openings 22 and inlet valves 24 for each cylinder are located at the inner terminus of intake or induction passages 30 in the head 18 and 30a in the head 20. These passages have outer terminal apertures 32 and 32a in the heads 18 and 20 respectively where they connect with associated passages of an intake manifold generally designated by the numeral 40. The manifold 40 preferably comprises, as shown, two substantially identical separable interlaced elongated sections 42 and 42a, the section 42 being secured by a suitable flanged mounting bracket 44 to the inner side of the cylinder head 18 and the manifold section 42a being similarly mounted by a flanged bracket 44a to the inner side of the cylinder head 20. In order to permit interlacing assembly of the sections 42 and 42a, a central portion 46 of one of the mounting flanges, for instance the mounting flange 44 is made removable and may be secured in position after the sections 42 and 42a are in place.

The section 42 has a plenum chamber 50 at its outboard end overhanging the bank 12 which receives a supply of air and fuel from a four-barrel carburetor (not shown) through primary and secondary risers 52 and 54 respectively. This plenum chamber 50 feeds the cylinders 2, 4, 6, and 8 of the bank 10 through individual conduits 56, 58, 60, and 62 which interconnect the plenum chamber 50 with the inlet passages 30 of the head 18 associated with the cylinders 2, 4, 6, and 8. Similarly the section 42a has an outboard plenum chamber 50a fed by a four-barrel carburetor (not shown) through suitable primary and secondary risers 52a, 54a, respectively. This plenum chamber 50a feeds the cylinders 1, 3, 5, and 7 through elongated conduits 56a, 58a, 60a, and 62a which connect this plenum chamber 50a with the inlet passages 30a of the cylinders 1, 3, 5, and 7 of the head 20.

The cylinder heads 18 and 20 respectively of the right and left banks are each provided with exhaust manifolds generally designated by the numerals 70, 70a which, as seen in FIGURE 1, each comprise an elongated passage 72, 72a formed by wall portions 74, 74a respectively. The exhaust manifold 70 is provided with exhaust inlets 76, 78, 80, and 82 which connect with the inlet ports 26 of the cylinders 2, 4, 6, and 8 of the right hand bank by the exhaust passages 84. Similarly, the exhaust manifold 70a at the left hand bank is provided with exhaust inlets 76a, 78a, 80a, and 82a which connect with the exhaust inlets 26 of the cylinders 1, 3, 5, and 7 by exhaust passages 84a.

Each of the exhaust manifolds 70, 70a is provided with a discharge outlet and conduit 90, 90a respectively, that for the right hand bank being located as seen in FIGURE 2 centrally, longitudinally of the exhaust manifold 70 and of the inlets 78, 80 while that for the exhaust manifold 70a is located at one end of the exhaust manifold 70a in juxtaposition to the exhaust inlet 82a associated with the cylinder 1. The discharge conduits 90, 90a are each provided with flanged end portions 92 which connect with suitable flange portions 94 of exhaust pipes 96, the flange portions 92, 94 being secured together by suitable nuts and bolts 97, 98. The exhaust pipes 96 in turn connect with suitable exhaust mufflers (not shown) there being one or two mufflers depending on whether the vehicle is equipped with single or dual mufflers. In the latter case, each of the exhaust pipes 96 will connect with a different muffler.

Each of the exhaust conduits of the exhaust manifolds is provided with a conventional counter-weighted thermostatically controlled heat valve generally designated by the numeral 100 as seen in FIGURE 2 which is operable to closed position to close the conduit 90 from the exhaust pipe 96 when the engine is cold and which is fully open to permit discharge of the exhaust gas from the exhaust manifolds when the engine is fully warmed up.

FIGURE 2 shows how the plenum chamber 50a of the manifold section 42a which feeds the left hand bank of cylinders is provided with warmup heat by the exhaust manifold 70 of the right hand bank of cylinders. Thus the plenum chamber 50a is provided with a heating compartment or hot spot 110 extending across the floor 112 of the plenum chamber 50a whereby the floor 112 acts as a heat exchanger between the compartment 110 and the chamber 50a for transmitting heat from the compartment 110 to the chamber 50a. In order to effect the stated heating, the hot spot or compartment 110 is connected by a suitable supply conduit 114 as seen in FIGURES 1 and 2 with the exhaust manifold 70. For this purpose the exhaust manifold 70 is provided with a supply outlet 116 located in a land 118 of the wall 74 of the exhaust manifold 70 to which a flanged end 120 of the supply conduit 114 is secured by bolts 122. At the opposite end of the supply pipe 114 the hot spot or compartment 110 is provided with a supply inlet 124 located in a mounting pad 126 at the bottom side of the compartment 110 and to which a flange portion 128 of the supply pipe 114 is secured by bolts 130. It will be observed that the supply inlet is located at one extreme side of the hot spot 110 whereas the discharge outlet 140 of the hot spot is located at the opposite side of the compartment 110. Moreover, that the supply inlet is immediately below a further heating compartment 142 connecting with the hot spot 110 and that supplies heat for the carburetor choke stove 144. The discharge outlet of the hot spot is located in a pad 146 and connects with a bypass pipe or conduit 148 having an inlet flanged portion 150 secured to the pad 146 by bolts 152 and having its opposite end connected with the exhaust pipe 96 and opening into the exhaust pipe 96 by an aperture 156, this connection occurring below the heat valve 100.

A similar construction is provided for the hot spot 110 of the plenum chamber 50 of the left hand bank, it having, as in FIGURE 1, a supply pipe 114a and a bypass pipe 148a, the conduit 114a connecting the exhaust manifold 70a with the hot spot 110 of the plenum chamber 50 and the bypass pipe 140a connecting the discharge side of the hot spot 110 of the plenum chamber 50 with the exhaust pipe 96 of the exhaust manifold 70a.

Now briefly describing the operation of one of the hot spot arrangements for instance that for the hot spot 110 for the plenum chamber 50 at the right hand bank of the engine, it will be understood that in warming up the engine, the heat valve 100 will be closed and the exhaust gases entering the exhaust manifold 70 through the inlets 76, 78, 80, and 82 from the cylinders 2, 4, 6, and 8 respectively, will be unable to pass directly to the exhaust pipe 96 and thence to the muffler since the valve 100 is then closed and will instead, because of a differential pressure existing between the exhaust manifold 70 at this time and the exhaust pipe 96 pass through the inlet conduit 114 to the hot spot 110 and out of the hot spot 110 after scrubbing across the floor 112 of the plenum chamber 50a to the bypass pipe 148 and discharge into the exhaust pipe 96 through the aperture 156. At low speeds of the engine when the valve 100 is open and little heat is required at the hot spot 110, most of the exhaust gas entering the exhaust manifold 70 will pass out of the discharge conduit 90 to the exhaust pipe 96. Little if any exhaust gas will pass to the hot spot through the supply pipe 114 for at this time the movement of the exhaust gases out the pipe 96 past the aperture 156 is at a rate insufficient to create a high enough extractor effect at the aperture 156 to create a pull on the exhaust gases in the manifold 70, passage 72 to pull any exhaust gas through the supply pipe 114, hot spot 110, and bypass pipe 148. However, at high engine speeds this extractor effect is considerable and under such conditions a considerable amount of exhaust gas passes through the supply conduit 114, hot spot 110 and bypass pipe 148 to heat the floor of the plenum chamber 50a at a time when no heat is desired.

A feature of the invention is the provision in the passage 72 of the exhaust manifold of means to counteract the extractor effect occurring at the bypass connection aperture 156 with the exhaust pipe 96. Such means preferably takes the form of a restriction in the passage 72 preferably intermediate at least a portion of the supply conduit inlet 116 and an exhaust gas inlet of the exhaust manifold for example as seen in FIGURES 2 and 3, the inlet 76. As best seen in FIGURES 3, 4, 5, and 6, such means will preferably take the form of a restriction 160 that will reduce the section of the passage 72 at the location of such restriction and of such form and shape as to effect a change in velocity of the exhaust gases from the inlet 76 in their movement in the passage 72 enabling such gas to oppose the oppositely moving exhaust gases from one or more of the remaining inlets for example 78, 80, and 82. As seen in FIGURES 3 to 6 the restriction may take the form of a wedge section member 162 which, as seen in FIGURE 3, may be integral with the wall 74 or as in FIGURES 5 and 6, may be separable therefrom. The wedge section 162, as seen in FIGURE 3 and 4, will extend the full height of the passage 72 as best seen in FIGURE 4, and will reduce the section of the passage 72 as seen in FIGURE 4 to a somewhat pie shape. The section 162 will preferably, as seen in FIGURE 3, be that of a triangular section whose short leg 163 corresponds to the thickness of the section 162 whose hypotenuse 164 forms an inclined plane in the passage 72 and whose other leg 165 parallels the inner surface of the wall 74. As will be evident from FIGURE 3, the shaping of the section 162 is such as to produce a gradual diminution in the section of the passage 72 from a point of full section at the base of the incline to a point of minimum section at the peak 166 of the incline where the distance between the section 162 and the portion 168 of the passage wall 74 is a minimum.

By preference, the restriction 160 will also be arranged to form an overhanging lip 170 at the inlet opening 116 in the wall 70 that connects with the supply pipe 114 such that the restriction 160 not only serves as a restriction in the passage 72 but also serves to create an extractor effect or low pressure zone at the aperture 116 which will oppose the counter extractor effect at the aperture 156 of the bypass pipe 148. It will be evident that as the exhaust gas from the inlet 76 moves in the direction of the arrows in FIGURE 3 over the restriction 160 it will create a low pressure area adjacent the forward face 163 of the restriction tending to oppose any counter movement of exhaust gases from the remaining inlets out the inlet 116 of the supply conduit 114. It is found that at high engine speeds this action together with the action of the gases from the inlet 76 in opposing those from the other inlets will substantially inhibit any movement of gases out the supply pipe 114 in a quantity sufficient to produce objectionable heating at the hot spot 110. Manifestly when the heat valve 100 is closed and warmup at the hot spot 110 is desired, the pressure differential in the passage 72 will favor the exhaust gases from the inlets 78, 80, and 82 and movement of the gases out the conduit 114 will take place.

FIGURE 5 shows a modification in which the restriction 160a is in the form of a separate member and which comprises a base 180 of ring-like character secured between the flanged coupling 120 of the supply conduit 114 and the pad 118 of the exhaust manifold by the previously described bolts 122. A portion of the member 160a is struck upwardly out of the base portion 180 to form the inclined plane face 182 and a straight portion 184 both of which project through the aperture 116 of the passage 72. Preferably, the aperture 116 in this construction will be of either rectangular or D-shape such that the portion 182 may form in effect a wedge which is the full height of the passage 72 at its intersection with the aperture 116.

FIGURE 6 shows a further modification wherein a restriction member 160b is also separable from the passage wall 74 but wherein the restriction 160b is carried by a supporting bracket generally designated by the numeral 190 comprising a ring-like base portion 192 secured to the pad 118 intermediate it and the coupling flange 120 of the supply pipe 114 by the bolts 122 and which has an upstanding finger 194 struck out of the base 192 and forming the aperture 196 in the base corresponding in size to the section of the supply pipe 114 and which upstanding finger 194 supports the restriction 160b by being mounted in a slotted portion 198 of the restriction member 160b or being cast therein. As will be evident from FIGURE 6 the bolt-receiving apertures 200 in the base portion 192 are slotted to permit adjustment of the restriction 160b in the lengthwise direction of the passage 72 while maintaining a seal between the coupling flange 120 and the pad 118. In this manner the restriction may be adjusted with respect to the aperture 116 to attain a desired extractor effect at this aperture.

It will be understood that a similar restriction may be provided in the exhaust manifold 70a of the left hand bank of the engine in a corresponding position relative to the supply pipe 114a and intermediate the aperture 116a therein and the inlet exhaust inlet 76a. Manifestly, the supply pipes 114, 114a may be positioned intermediate any aperture of exhaust inlets to attain the desired control effect on the exhaust flow to the hot spot 110.

Now describing the operation of the device, it will be evident that during engine warmup, as when the heat valve 100 is closed, the exhaust gases entering the exhaust manifold passage 72 from the inlets 76, 78, 80, and 82 being prevented from passing out the discharge outlet 90 of the exhaust manifold will seek a point of lower potential with resulting movement of the gases to the supply pipe 114 and therethrough to the hot spot 110 and thence to the exhaust pipe 96 through the bypass pipe 148. In this movement, some opposition to the natural movement of the gases will be caused by the exhaust gas from the inlet 76 in passing over the restriction 160 but such will not be sufficient to prevent a substantial movement of hot exhaust gas to the hot spot 110 to perform its job of heating the charge of air and fuel entering the plenum chamber 50a. When the engine is thoroughly warmed up and for example operating at high speed, the heat valve 100 will be wide open such that the exhaust gases will tend to move out the discharge outlet 90 into the exhaust pipe 96. The velocity of these gases is sufficient to produce an extractor effect at the aperture 156 of the bypass pipe 148 at its connection with the exhaust pipe 96 to cause movement of exhaust gases through the supply pipe 114 and the hot spot 110. However, the counter extractor effect produced by the restriction 160 and its effect of increasing the velocity of the exhaust gases from the inlet 76 in moving lengthwise of the passage 72 will oppose the tendency of the exhaust gases from the inlets 78, 80, and 82 to move out the supply pipe 114 and reduce this movement to a minimum thereby inhibiting heating of the hot spot 110 to an extent to produce a power loss in the engine.

From the foregoing description of the invention, it will be evident that a novel control structure has been provided for preventing overheating of the air-fuel mixture charge fed to the engine cylinders and for inhibiting a consequent power loss during high speed operation of the engine. Manifestly, various changes in the specific form of the restriction member provided in the exhaust manifold passage may be made and will suggest themselves to those skilled in the art without departing from the intent and spirit of the invention. All such changes and modifications are contemplated as are within the purview of the appended claims.

I claim:

1. In an engine having a bank of cylinders, an intake system for feeding a charge to said cylinders, an exhaust manifold for collecting exhaust gases from said cylinders, said exhaust manifold having a plurality of exhaust gas inlets and having a discharge outlet, exhaust gas charge heating means in heat exchange relationship with a portion of said intake system, conduit means for conducting exhaust gas from said exhaust manifold to said charge heating means, and a stationary restriction in said exhaust manifold intermediate a pair of said inlets and in the gas stream of said conduit means for controlling exhaust gas flow to said charge heating means through said conduit means.

2. In an engine having a bank of cylinders, an intake system for feeding a charge to said cylinders including an intake manifold, an exhaust manifold for collecting exhaust gases from said cylinders, said exhaust manifold having a plurality of exhaust gas inlets and having a discharge outlet, exhaust gas charge heating means in heat exchange relationship with a portion of said intake manifold, conduit means interconnecting said exhaust manifold with said charge heating means for conducting exhaust gas from said exhaust manifold to said charge heating means, and a stationary restriction in said exhaust manifold intermediate a pair of said inlets and at said connection of said conduit means with said exhaust manifold for controlling exhaust gas flow to said charge heating means through said conduit means.

3. In an engine having a bank of cylinders, an intake system for feeding a charge to said cylinders, said system including an intake manifold, an exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet through which to discharge exhaust gas from said passage, exhaust gas charge heating means in heat exchange relationship with a portion of said intake manifold, an aperture in said wall portion of said exhaust manifold, conduit means connecting said aperture with said charge heating means, and deflector means carried by said wall portion at said aperture and positioned intermediate at least a portion of said aperture and one of said inlets, said deflector means providing a restriction in said passage to control the flow of exhaust gases from said passage to said charge heating means through said conduit means.

4. In an engine having a bank of cylinders, an intake system for feeding a charge to said cylinders, said system including an intake manifold, a runner-type exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet through which to discharge exhaust gas from said passage, exhaust gas charge heating means in heat exchange relationship with a portion of said intake manifold, an aperture in said wall portion of said exhaust manifold, conduit means connecting said aperture with said charge heating means, and a restriction means carried by said wall portion in said passage at least in part over the mouth of said aperture and intermediate at least a portion of said aperture and one of said inlets, said restriction means controlling the flow of exhaust gases from said passage to said charge heating means through said conduit means.

5. In an engine having a bank of cylinders, an intake system for feeding a charge to said cylinders, said system including an intake manifold, a runner-type exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet through which to discharge exhaust gas from said passage, exhaust gas charge heating means in heat exchange relationship with a portion of said intake manifold, an aperture in said wall portion of said exhaust manifold, conduit means connecting said aperture with said charge heating means, and a restriction means in said passage in juxtaposition to the mouth of said aperture and positioned intermediate at least a portion of said aperture and one of said inlets, said restriction means being carried by said wall portion and having an inclined face extending lengthwise of said passage and rising in the direction away from said one inlet for controlling the flow of exhaust gases from said passage to said charge heating means through said conduit means.

6. In an engine having a bank of cylinders, an intake system for feeding a charge to said cylinders, said system including an intake manifold, a runner-type exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet through which to discharge exhaust gas from said passage, exhaust gas charge heating means in heat exchange relationship with a portion of said intake manifold, an aperture in said wall portion of said exhaust manifold, conduit means connecting said aperture with said charge heating means, and a separable restriction means carried by said wall portion adjacent said aperture, said restriction means including a mounting portion and an inclined plane portion, the latter extending into said passage intermediate one of said inlets and the side of said aperture most remote from this one inlet, said inclined plane portion having an inclined face extending lengthwise of said passage and rising in the direction away from said one inlet for controlling the flow of exhaust gases from said passage to said charge heating means through said conduit means.

7. In an engine having a bank of cylinders, an intake system for feeding a charge to said cylinders, said system including an intake manifold, a runner-type exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet through which to discharge exhaust gas from said passage, exhaust gas charge heating means in heat exchange relationship with a portion of said intake manifold, an aperture in said wall portion of said exhaust manifold, conduit means connecting said aperture with said charge heating means, and an adjustable restriction means carried by said wall portion adjacent said aperture and including a wedge-shaped portion positioned in said passage and adjustable lengthwise of said passage between said aperture and one of said inlets, said wedge portion having its thin end nearest said one inlet and increasing in thickness lengthwise of said passage in the direction away from said one inlet, said wedge portion providing a restriction in said passage to control the flow of exhaust gases from said passage to said charge heating means through said conduit means.

8. In an engine having a bank of cylinders, an intake system for feeding a charge to said cylinders, said system including an intake manifold; an exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet and conduit through which to discharge exhaust gas from said passage, said conduit including a thermostatically controlled heat valve movable between a substantially fully open and a substantially fully closed position, exhaust gas charge heating means in heat exchange relationship with a portion of said intake manifold, an aperture in said wall portion of said exhaust manifold, supply conduit means connecting said aperture with said charge heating means, and deflector means carried by said wall portion at said aperture and positioned intermediate at least a portion of said aperture and one of said inlets, said deflector means providing a restriction in said passage to control the flow of exhaust gases from said passage to said charge heating means through said supply conduit means when said heat valve is open.

9. In an engine having a bank of cylinders, an intake system for feeding a charge to said cylinders, said system including an intake manifold comprising a plenum chamber for receiving a charge supply and a plurality of intake conduits for conducting the charge from said plenum chamber to the cylinders, said chamber including a heating compartment for receiving hot exhaust gases for heating said chamber and thereby said charge supply, an exhaust manifold having a wall portion defining an elongated passage for collecting exhaust gases from said cylinders, said exhaust manifold also having a plurality of exhaust gas inlets spaced apart longitudinally of said passage and opening into said passage and having an exhaust gas discharge outlet and conduit through which to discharge exhaust gas from said passage, said conduit including a thermostatically controlled heat valve movable between a substantially fully open and a substantially fully closed position, an aperture in said wall portion of said exhaust manifold, supply conduit means connecting said aperture with said heating compartment inlet, bypass conduit means connecting said heating compartment outlet with said exhaust gas discharge conduit outwardly beyond said heat control valve, and deflector means carried by said wall portion at said aperture and positioned intermediate at least a portion of said aperture and one of said inlets, said deflector means providing a restriction in said passage to control the flow of exhaust gases from said passage to said heating compartment through said supply conduit means when said heat valve is open.

10. In an engine as claimed in claim 9 wherein said exhaust gas discharge conduit has a flanged portion securing the same to said exhaust manifold over said aperture and wherein said deflector is a separable member mounted between said exhaust manifold and said flanged portion of said discharge conduit and has a restriction forming portion projecting into said passage through said aperture.

References Cited in the file of this patent
UNITED STATES PATENTS 1,889,270    Thomas et al. _____ Nov. 29, 1932
2,121,529    Moore _____ June 21, 1938